Oct. 20, 1953 M. W. GALLIERS 2,656,200
FLUID-TIGHT JOINT
Filed Dec. 30, 1949
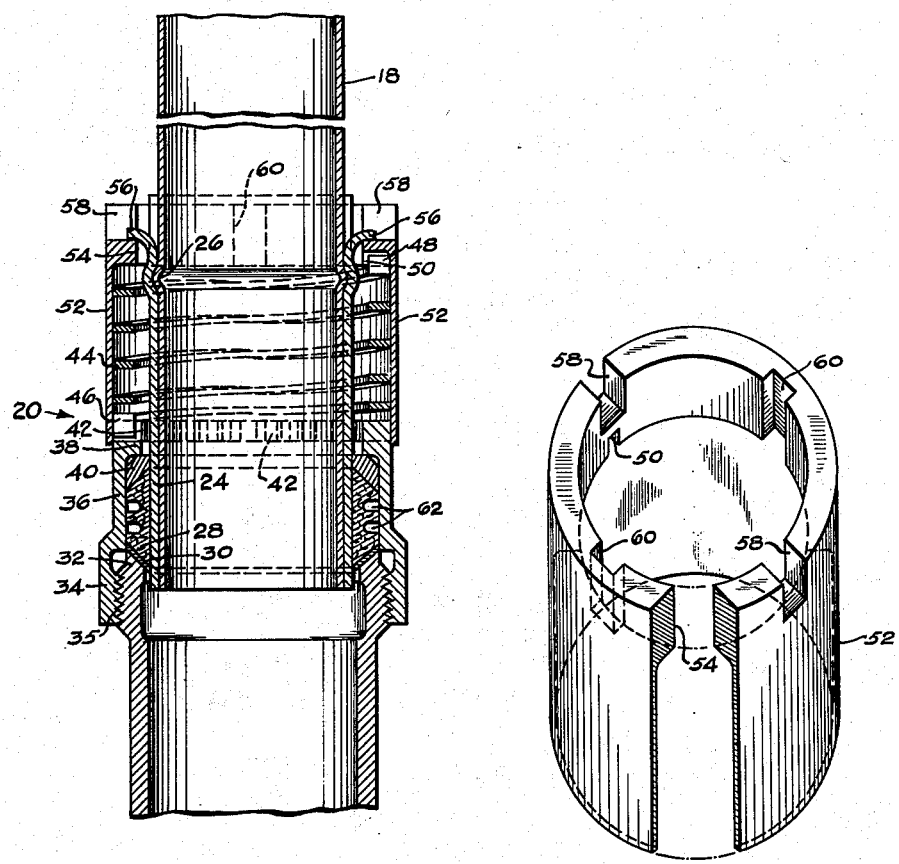
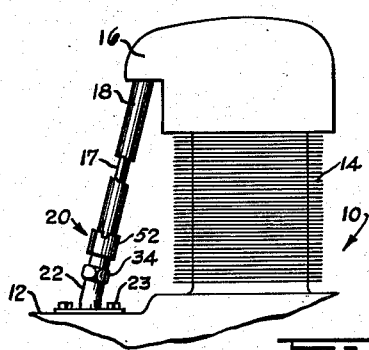
INVENTOR.
MARSHALL W. GALLIERS
BY
ATTORNEY Patented Oct. 20, 1953

2,656,200

UNITED STATES PATENT OFFICE 2,656,200

FLUID-TIGHT JOINT

Marshall W. Galliers, Radburn, N. J., assignor to Curtiss-Wright Corporation, a corporation of Delaware Application December 30, 1949, Serial No. 135,945

1 Claim. (Cl. 285—122)

This invention relates to fluid-tight joints and is particularly directed to a fluid-tight joint which is capable of withstanding high temperatures and vibration forces. The fluid-tight joint of the present invention has been designed to provide an oil seal at an end of the housing for a valve operating push rod of a radial cylinder aircraft engine. As will appear, however, the fluid-tight joint of the present invention is not limited to this particular use but instead is of general application.

In a conventional radial cylinder aircraft engine, the engine cylinders are mounted on the engine crankcase and extend radially outwardly from said crankcase. In addition, valve operating push rods extend from said crankcase to rocker boxes disposed on the outer ends of the engine cylinders. Each of these push rods is enclosed in a housing and lubricating oil is circulated between the engine crankcase and said rocker boxes through the push rod housings. Furthermore because the engine cylinders vibrate relative to the engine crankcase, the push rod housings cannot be rigidly connected to both the engine crankcase and to the rocker boxes on the engine cylinders. It is essential therefore that a flexible oil-tight joint or coupling be provided at one end of each push rod housing. Because of their location on an aircraft engine, said joints or couplings are subject to considerable vibration as well as to high temperatures. Accordingly, an object of the present invention comprises the provision of a novel and improved flexible fluid-tight joint which will withstand high temperatures and which will remain fluid-tight notwithstanding vibration of said joint.

In accordance with the present invention, the fluid-tight joint comprises a packing, preferably of malleable metallic material, against which a nut is tightened and a spring is provided for continually urging said nut against said packing.

Other objects of the invention will become apparent upon reading the annexed detailed description in connection with the drawing in which:

Figure 1 is a schematic view of a portion of an aircraft engine illustrating a push rod housing;

Figure 2 is an axial sectional view of a fluid-tight joint for the push rod housing illustrated in Figure 1; and Figure 3 is a perspective view of the movable sleeve included in the fluid-tight joint of Figure 2.

Referring first to Figure 1, an aircraft engine is indicated in part at 10, said engine comprising a crankcase 12 having a plurality of cylinders 14 mounted about said crankcase and extending radially therefrom. The head of each engine cylinder has a rocker box structure 16 rigid therewith. Valve operating push rods 17 extend from the engine crankcase to the cylinder rocker boxes for operation of the cylinder valves, there being one push rod for each cylinder valve. Each push rod 17 is enclosed in a tubular housing 18. The ends of each push rod housing are connected to the engine crankcase and to its respective rocker box, said housing providing for the circulation of oil between said crankcase and its rocker box. Because of relative vibration between the engine cylinders and the engine crankcase, the connection of each push rod housing 18 to the engine crankcase and/or to its rocker box must be flexible and fluid-tight to permit said relative vibration without leakage of oil. Reference numeral 20 designates a flexible fluid-tight joint between the push rod housing 18 and a tubular fitting or member 22, said joint 20 being illustrated in detail in Figures 2 and 3. The fitting 22 is rigidly secured to the engine crankcase by screws 23. A similar fluid-tight joint may be provided between the other end of said push rod housing 18 and its associated rocker box 16 or the push rod housing 18 may be rigidly connected to the rocker box.

Referring now particularly to Figures 2 and 3, a short tube 24 is secured in fluid-tight relation about an end of the tubular push rod housing 18 by brazing and/or by the bead 26. This end of the push rod housing extends into the tubular crankcase member or fitting 22 in clearance relation to said member. A deformable packing ring 28 is fitted about said end of the push rod housing 18. A metallic washer 30 is disposed between the end face or shoulder 32 of the tubular member 22 and the adjacent end of the packing ring 28. A nut 34 is threadedly connected to the tubular fitting 22 at 35, said nut having a cylindrical extension 36 with an inturned flange 38 at its free end. A washer 40 is disposed between the flange 38 and the other end of the packing ring 28 whereby the nut 34 can be tightened against the packing ring 28 to squeeze said ring against the shoulder 32. The washers 38 and 40 are provided to prevent extrusion of the packing ring between the nut 34 and the tube 24. There is sufficient clearance at the peripheries of the washers 30 and 40 to accommodate slight misalinement of the push rod housing 18 and the crankcase fitting 22 and said washers are preferably made of some soft metal as aluminum. With the packing ring squeezed between the flange 38 of the nut 34 and the shoulder 32, a fluid-tight seal is provided at each end of the packing ring and in addition this squeezing of the packing ring deforms said ring radially to provide a fluid-tight seal between the packing ring and the external surface of the push rod housing tube 24. Accordingly when the packing ring 28 is squeezed against the shoulder 32 said ring is effective to prevent leakage from the interior of the push rod housing 18 and the crankcase fitting 22.

The packing ring 28 preferably has a cross-section which is tapered in a radially outward direction so that, as illustrated, the end faces of said ring are inclined toward each other in said radially outward direction. This tapered cross-section of the packing ring 28 increases the radially inward pressure of said packing ring against the push rod housing tube 24 as a result of the axial pressure of the nut 34 thereby increasing the effectiveness of the seal provided by said ring.

With the structure so far described, the nut 34 will tend to back off or away from the packing ring as the joint 20 vibrates thereby relieving the packing ring of pressure. In addition the packing ring by itself will tend to relieve the pressure of the nut 32 by taking a permanent set or deformation. Obviously any relief of the pressure of the nut 34 on the packing ring 28 destroys or at least reduces the effectiveness of the seal provided by the joint 20. In accordance with the present invention means are provided to maintain the pressure of the nut 34 against the packing ring 28. For this purpose the nut 34 is provided with one or more notches 42 at its flanged end and a helical spring 44, disposed about the tube 24, has a tab 46 extending into one of said notches 42. A tab 48 at the other end of the spring 44 extends into a notch 50 formed in a sleeve 52. The sleeve 52 has an inturned flange at its end remote from the nut 34 within which the notch 50 is formed. The sleeve 52 surrounds the spring 44 and is piloted about the cylindrical extension 36 of the nut 34. The push rod housing tube 24 has a pair of projecting tabs 56 struck up therefrom, said tabs being adapted to be received within notches 58 formed in the free end of the sleeve flange 54. At this point it should be noted that the purpose of the tube 24 is to reinforce the adjacent end of the push rod housing 18 and to provide a convenient means of forming the tabs 56 rigid with said housing 18.

With the spring 44 and sleeve 52, the pressure of the nut 34 against the packing ring 28 can be maintained by torsionally winding up the spring 44. In order to wind up the spring 44, the sleeve 52 is moved axially against the spring 44 so as to clear or free the tabs 56 from the notches 58 and then said sleeve is rotated to wind up the spring 44 in a direction so as to urge the nut in a tightening direction against the packing ring 28. The spring 44 is wound up by the sleeve 52 to the desired extent and then said sleeve is moved axially back away from the nut 34 so as to reseat the tabs 56 in the notches 58 thereby anchoring the sleeve 52 to the push rod housing 18. The tube 24 and its push rod housing 18 are anchored to the rocker box 16 so that when the tabs 56 are received within the notches 58 of the sleeve 52, said sleeve fixedly anchors one end of the spring 44 while the other end of said spring is anchored to and rotatively urges the nut 34 in a direction to compress the packing ring 28. Accordingly the spring 44, when wound up, is operative to maintain pressure of the nut 34 against the packing ring 28, the magnitude of said pressure being dependent on the extent to which said spring is wound up by the sleeve 52. Obviously the spring 44 will keep the nut 34 from backing away from the packing ring 28, for example as a result of vibration of the joint 20. In addition, the spring 44 will maintain a predetermined pressure of the nut 34 against the packing ring 28 even though said ring takes a permanent set or deformation. Furthermore, because of the friction of the threaded connection 35 between the nut 34 and the crankcase fitting 22, vibration and/or acceleration of the parts comprising the fluid-tight connection 20 does not tend to relieve the pressure against the packing ring 28. Accordingly the fluid-tight joint 20 will remain fluid-tight notwithstanding vibration of said joint.

As illustrated, the sleeve 52 has only a single pair of diametrically opposed notches 58 to receive the tabs 56 of the tube 24. With but a single pair of notches 58 the sleeve 52 can be anchored against rotation relative to the push rod housing 18 only in positions which are 180° apart. In order, however, to provide finer adjustment of the torque exerted by the spring 44 against the nut 34, additional pairs of diametrically opposed notches 58 may be provided in the free end of the sleeve flange 54.

For assembly and disassembly purposes, the flange 54 on the sleeve 52 is provided with a pair of diametrically opposed grooves 60 extending from one end to the other of the interior surface of said flange. With this arrangement, when the fluid-tight joint 20 is to be disassembled, the sleeve 52 is moved axially against the spring 44 to free the tabs 56 from the notches 58. The sleeve 52 is then rotated to bring its grooves 60 in alinement with the tabs 56 whereupon said sleeve is moved axially away from the nut 34, the tabs 56 passing through the grooves 60. After, or simultaneously with, movement of the sleeve 52 away from the nut 34 the spring 44 can be moved in the same direction, whereupon the nut 34 can be unscrewed from its threads. In assembling or reassembling fluid-tight joint 20 the above steps are reversed.

The push rod housing 18 may be threadedly anchored to its rocker box 16. Thus, if the nut 34 has right-hand threads and the push rod housing 18 is anchored to its rocker box 16 by right-hand threads, the spring 44 tends to tighten the threaded connection of the push rod housing 18 to its rocker box.

The packing ring may comprise any suitable material. Preferably, however, the ring is made of malleable metallic material such as lead, annealed copper, etc. The use of malleable metallic material for the packing ring is made feasible because the spring 44 maintains axial pressure of the nut 34 against said packing ring. Furthermore malleable metallic material obviously is capable of withstanding relatively high temperatures compared to other packing ring materials. Accordingly malleable metallic packing ring material is particularly suitable for use in a fluid-tight connection for a push rod housing because of the high temperatures encountered by such a connection during engine operation. The packing ring 28 may also have a plurality of annular grooves 62 about its external periphery and spaced from the ends of said ring. This grooved construction tends to increase the radially inward pressure of the packing ring against the push rod housing tube 24.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A fluid-tight joint comprising a first tubular member; a second tubular member co-axial with said first member; an annular packing ring disposed about an end of said first tubular member; a shoulder on said second tubular member adjacent to said packing ring; a nut for squeezing said packing ring against said shoulder, said nut having a threaded connection with said second tubular member whereby rotation of said nut varies the extent to which said packing ring is squeezed against said shoulders; a sleeve disposed about said first member; a plurality of projections on said first member received within notches in said sleeve at the end of said sleeve remote from said nut for preventing relative rotation of said sleeve and first tubular member; and a helical spring disposed about said first tubular member between said nut and said sleeve end and surrounded by said sleeve with one end of said spring anchored to said nut and with the other end of said spring anchored to said sleeve end for urging said nut in a direction for squeezing said packing ring against said shoulder, said sleeve being axially movable toward said nut to free said sleeve from said projections thereby permitting relative rotation of said sleeve and first tubular member, said sleeve also having a plurality of axially extending internal grooves to permit said sleeve to be moved axially away from said nut upon rotative alinement of said grooves with said projections.

MARSHALL W. GALLIERS.

References Cited in the file of this patent

UNITED STATES PATENTS

| Number | Name | Date |
|---|---|---|
| 336,129 | McGahan | Feb. 16, 1886 |
| 734,633 | Titus | July 28, 1903 |
| 1,067,533 | Mann | July 15, 1913 |
| 1,494,169 | Johnson | May 13, 1924 |
| 1,804,581 | Wigle | May 12, 1931 |